(12) United States Patent
Matsuda

(10) Patent No.: US 8,301,212 B2  
(45) Date of Patent: Oct. 30, 2012

(54) PORTABLE WIRELESS APPARATUS AND ANTENNA STRUCTURE

(75) Inventor: Satoshi Matsuda, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 1095 days.

(21) Appl. No.: 12/182,729

(22) Filed: Jul. 30, 2008

(65) Prior Publication Data

US 2009/0061967 A1  Mar. 5, 2009

(30) Foreign Application Priority Data

Jul. 30, 2007 (JP) .................. 2007-198186

(51) Int. Cl.  
*H04M 1/00* (2006.01)

(52) U.S. Cl. .................. 455/575.7; 455/575.5

(58) Field of Classification Search .............. 455/550.1, 455/575.1, 575.5, 90.2, 90.3, 350; 379/433.01, 379/433.03; 343/702, 904, 906, 907, 908  
See application file for complete search history.

(56) References Cited

U.S. PATENT DOCUMENTS

| | | | |
|---|---|---|---|
| 7,274,340 B2 * | 9/2007 | Ozden et al. | 343/860 |
| 7,369,883 B2 * | 5/2008 | Kori et al. | 455/575.3 |
| 7,750,854 B2 * | 7/2010 | Wedel et al. | 343/702 |
| 2002/0142794 A1 * | 10/2002 | Harano | 455/550 |
| 2006/0049988 A1 * | 3/2006 | Kim et al. | 343/700 MS |
| 2007/0066274 A1 * | 3/2007 | Kim | 455/350 |

FOREIGN PATENT DOCUMENTS

| | | |
|---|---|---|
| JP | 1999-177485 | 2/1999 |
| JP | 2001-284934 | 3/2002 |
| JP | 2003-338769 | 11/2003 |

* cited by examiner

*Primary Examiner* — Wesley Kim  
(74) *Attorney, Agent, or Firm* — Procopio, Cory, Hargreaves & Savitch LLP

(57) ABSTRACT

A portable wireless apparatus includes a casing, an antenna and another electronic component. The antenna is contained in an end portion of the casing. The antenna includes a first and second antenna element, an antenna board and a antenna connector. The antenna board has a mounting face on which the first and second antenna elements are mounted. The antenna connector is formed on the antenna board and connects the first antenna element to the second antenna element. A predetermined space is provided between the first and second antenna elements. The other electronic component is disposed so as not to overlap the antenna connector in a direction orthogonal to the mounting face of the antenna board, and at least part of the other electronic component is disposed in the predetermined space.

1 Claim, 6 Drawing Sheets

PORTABLE WIRELESS APPARATUS AND ANTENNA STRUCTURE

CROSS-REFERENCE TO RELATED APPLICATION

The present application claims priority under 35 U.S.C. §119 to Japanese Patent Application No. 2007-198186, filed Jul. 30, 2007, entitled "PORTABLE WIRELESS APPARATUS." The contents of this application are incorporated herein by reference in their entirety.

BACKGROUND OF THE INVENTION

1. Field of the Invention

The present invention relates to a portable wireless apparatus that includes an antenna and performs communication with other apparatuses.

2. Description of the Related Art

Recent portable wireless terminals such as cellular phones have a built-in antenna provided in an end portion of a casing.

In a folding-type portable wireless terminal, when an antenna is in a lower casing which has operation keys, it is preferable that the antenna be accommodated in an end portion located opposite a hinge.

For example, when a user uses a portable terminal apparatus, such as a folding-type portable wireless terminal, to make a call, the user opens up the folding-type portable wireless terminal so that the user can originate a call and places the portable wireless terminal against the user's ear to use the portable wireless terminal. In such a case, the entire end portion where an antenna is contained is generally rarely covered with a hand or face, causing no damage to the radio characteristics of the antenna. When the antenna is disposed in the end portion of the casing, there is an advantage that the radio reception state changes negligibly depending on the state of the portable wireless terminal (whether it is opened or closed).

At present, portable wireless terminals are becoming smaller and thinner. Therefore, with the foregoing structure in which the antenna is contained in the end portion of the lower casing where the operation keys are disposed, the built-in antenna and a microphone for communicating a voice are disposed close to each other.

When the microphone, which includes a conductive material, is placed near the antenna, the microphone may affect the antenna's transmission and reception sensitivity.

The microphone outputs noise when being used. The noise may affect the antenna's transmission and reception sensitivity.

In order to overcome this problem, it has been proposed to dispose the built-in antenna near the hinge mechanism so that the antenna can be away from the microphone. However, in the case where the built-in antenna is disposed near the hinge, when the user uses the portable terminal apparatus to make a call, the user opens up the folding-type portable wireless terminal so that the portable wireless terminal can originate a call and places the portable wireless terminal against the face to use the portable wireless terminal. As a result, a portion containing the antenna is covered with a hand and the face, which may result in degradation of the antenna's transmission and reception sensitivity.

It has been proposed to provide a plurality of built-in antennas in a casing of a portable wireless terminal so that a different antenna can be used to make a call. However, when the built-in antennas are provided in the casing to avoid the effect of a microphone that is disposed nearby, the size of the portable wireless terminal increases.

Thus, there has been a demand for a portable wireless apparatus that can avoid degradation of transmission and reception sensitivity of an antenna without involving an increase in the size of a casing.

SUMMARY OF THE INVENTION

According to an aspect of the present invention, a portable wireless apparatus includes a casing, an antenna contained and another electronic component. The antenna is contained in an end portion of the casing. The antenna includes a first antenna element, a second antenna element, an antenna board and a antenna connector. The antenna board has a mounting face on which the first antenna element and the second antenna element are mounted. The antenna connector is formed on the antenna board and connects the first antenna element to the second antenna element. A predetermined space is provided between the first antenna element and the second antenna element. The other electronic component is disposed so as not to overlap the antenna connector in a direction orthogonal to the mounting face of the antenna board, and at least part of the other electronic component is disposed in the predetermined space.

DESCRIPTION OF THE PREFERRED EMBODIMENTS

Figure 1:
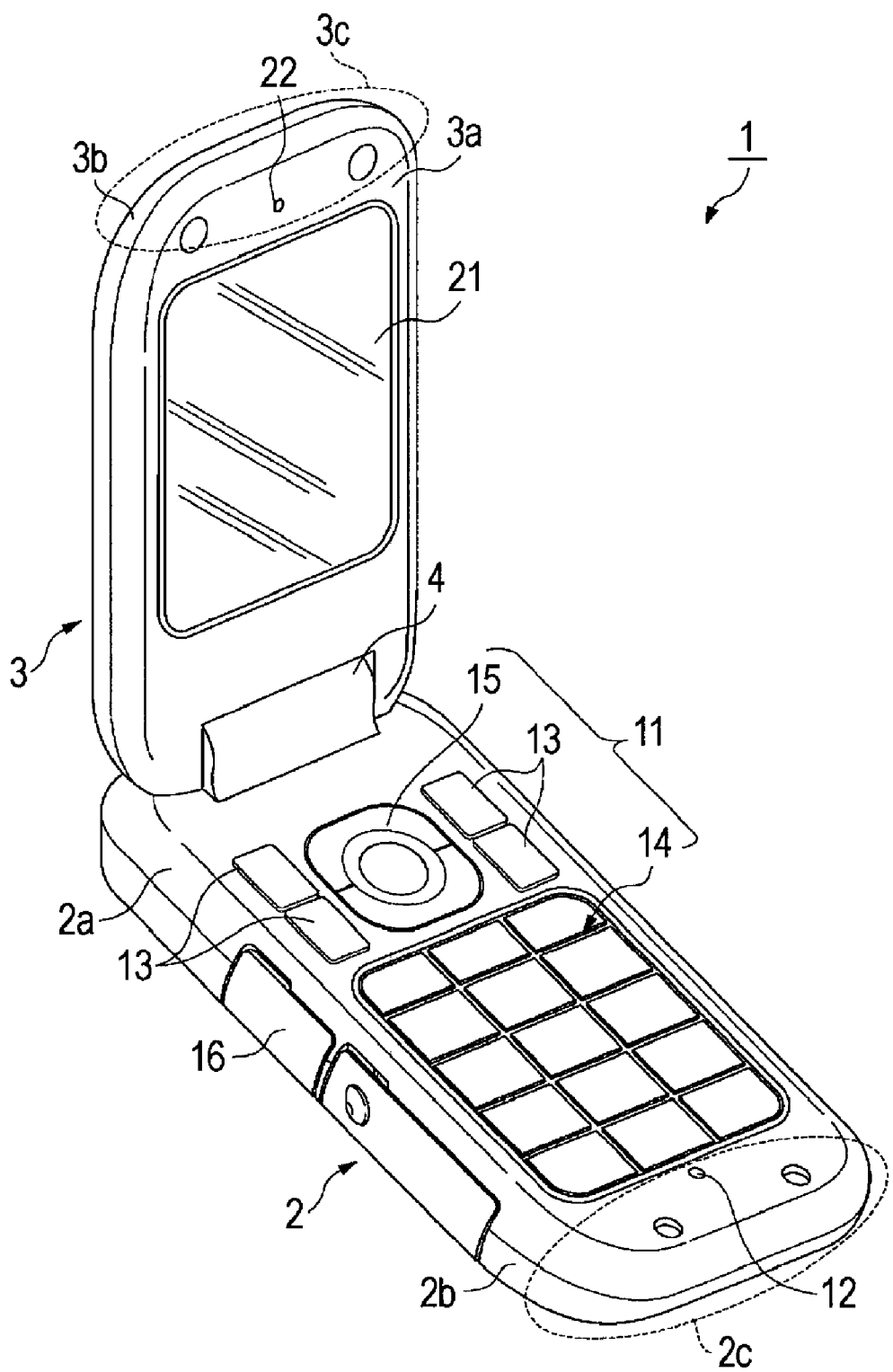
FIG. 1 is a perspective view of an external appearance of a cellular phone apparatus.

FIG. 1 is an external perspective view of a cellular phone apparatus 1, which is an example of a portable wireless apparatus that communicates with an external apparatus (base station), according to the present embodiment.

The cellular phone apparatus 1 includes an first casing portion 2 and a second casing portion 3. The first casing portion 2 includes a front case 2a and a rear case 2b. The first casing portion 2 has a group of operation buttons 11 which is exposed at the surface of the front case 2a. A microphone hole 12 is provided in an end portion 2c. A voice of a user of the cellular phone apparatus 1 who is making a call is input through the microphone hole 12. The group of operation buttons 11 includes function setting buttons 13 for setting and activating various settings including an address book function and a text message function, input operation buttons 14 for entering numerals for phone numbers and characters for text messages, and decision making buttons 15 for making decisions in various operations. The decision making buttons 15 can perform scrolling operations. A cap 16 that covers an interface for communicating with an external apparatus (e.g., a host apparatus) is provided on a side face of the first casing portion 2.

The second casing portion 3 includes a front panel 3a and a rear panel 3b. In the second casing portion 3, a display 21 which displays various items of information is exposed at the front panel 3a. A loudspeaker hole 22 is provided in an end portion 3c. A voice of a person on the other end of the line is output from the loudspeaker hole 22.

An upper portion of the first casing portion 2 and a lower portion of the second casing portion 3 are connected to each other via a hinge mechanism 4, as shown in FIG. 1. By relatively moving the first casing portion 2 and the second casing portion 3 using the hinge 4 as a pivot point, the cellular phone apparatus 1 can be in an open state and in a closed state. In the open state, both the first casing portion 2 and the second casing portion 3 are opened. In the closed state, the first casing portion 2 and the second casing portion 3 are closed.

In the present embodiment, the folding-type cellular phone apparatus 1 with the use of the hinge mechanism 4 is described. Alternatively, the cellular phone apparatus 1 may be, instead of a folding type, a slide type, a rotation type, a straight type and a type in which the first casing portion 2 and the second casing portion 3 are connected to each other via a two-axis hinge. In the slide type, one of the first casing portion 2 and the second casing portion 3 which are placed on each other can be slid in one direction. In a rotation type, one of the first casing portion 2 and the second casing portion 3 can be rotated around an axis along the direction in which the first casing portion 2 and the second casing portion 3 are placed on each other. In a straight type the first casing portion 2 and the second casing portion 3 are disposed in one casing.

Figure 2:
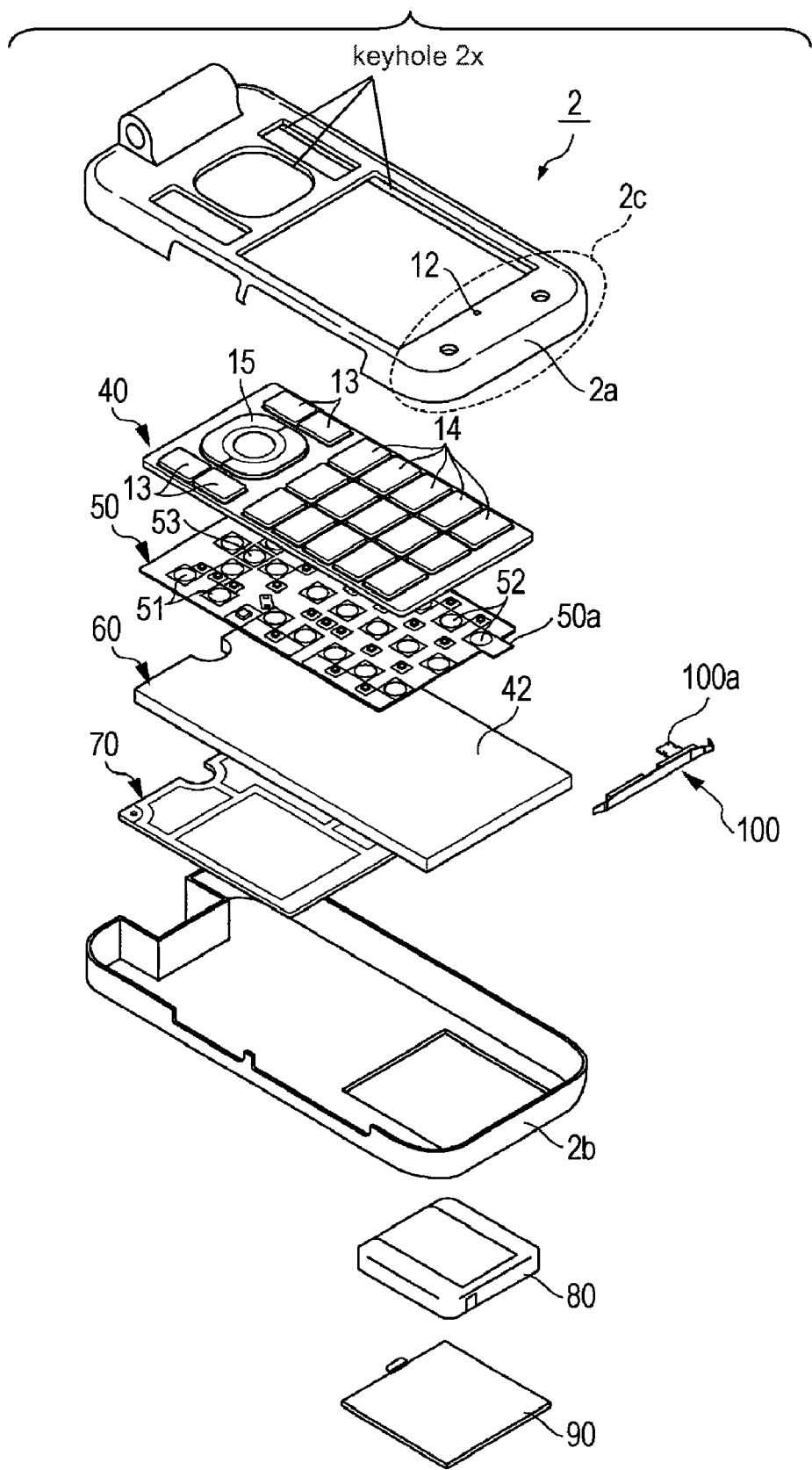
FIG. 2 is an exploded perspective view of members contained in a first casing portion where an operation unit is provided.

Referring to FIG. 2, the first casing portion 2 includes, in addition to the front case 2a and the rear case 2b, a key sheet 40 including the group of operation buttons 11 described above thereon, a first printed circuit board 50 (first circuit board), a second printed circuit board 100 (antenna board), a shield case 60, a second circuit board 70, a battery 80, and a battery lid 90. The first printed circuit board 50 and the second printed circuit board 100 may include a flexible board. The second circuit board 70 includes a layer which has referential potentials are formed thereon and a layer which various electronic components such as a radio frequency (RF) signal processor for a cellular phone are formed thereon. The various electronic components on the second circuit board are covered and shielded by the shield case 60.

The first printed circuit board 50 includes a first connector 50a and the second printed circuit board 100 includes a second connector 100a. The first printed circuit board 50 is electrically connected to the second printed circuit board 100 by connecting the first connector 50a with the second connector 100a. The connector 100a is continuous with a base end of an extended portion 100f (first extended portion), which will be described later, and is provided in an end portion of an extended portion (second extended portion) which is formed by extending part of the periphery of the second printed circuit board 100.

The first printed circuit board 50 and the second circuit board 70 are electrically connected to each other via connectors (not shown). Therefore, an antenna unit 100b and a microphone 100g (voice input unit) that are mounted on the first casing portion 2 are electrically connected to the RF signal processor of the second circuit board 70 via the first printed circuit board 50, a detailed description of which will be given later.

In the first casing portion 2, the front case 2a, the key sheet 40, the first printed circuit board 50, the shield case 60, the second circuit board 70, and the rear case 2b may be stacked in this order. The battery 80 is removably accommodated from the outside of the rear case 2b and is covered with the battery lid 90.

Recessed internal faces of the front case 2a and the rear case 2b are facing each other and peripheral flanges of the cases 2a and 2b overlap each other, thus connecting the front case 2a to the rear case 2b. The key sheet 40, the first printed circuit board 50, the shield case 60, and the second circuit board 70 are sandwiched between the front case 2a and the rear case 2b so as to be contained therein. That is, the shield case 60 covers the second circuit board 70. The first printed circuit board 50 is placed on an upper face of the shield case 60. The key sheet 40 is placed on an upper face of the first printed circuit board 50.

The second circuit board 70 and the shield case 60 may be partially fixed using a plurality of connectors for reassemble. The second circuit board 70 includes various electronic components. These electronic components form a plurality of circuit blocks with predetermined combinations. For example, various circuit blocks including a wireless circuit, a power supply circuit, and a digital circuit are formed.

The shield case 60 may be a electrically conductive member with a shape in which one wide face of a thin rectangular parallelepiped is open. The electrically conductive member can be a metal, and alternatively the framework of the shield case 60 may be a resin with a conductor film on the surface thereof.

A plurality of key switches 51, 52, and 53 are provided on a face, which faces the front case 2a, of the first printed circuit board 50 and are placed on a plate portion 42 of the shield case 60. The key switches 51, 52, and 53 each may have a metal dome which is curved in a bowl shape and formed in three dimensions. When the tip of the bowl shape is pressed, the metal dome contacts a switch terminal formed in an electric circuit (not shown) which is printed on the surface of the first printed circuit board 50, thereby establishing an electric connection.

The key sheet 40 includes a sheet 41 and the group of operation buttons (key top) on the sheet 41. The sheet 41 may be a silicon rubber and a like. The group of operation buttons 11 may be glued on a surface of the sheet 41. The group of operation buttons 11 includes function setting buttons 13, the input operation buttons 14, and the decision making buttons 15. The group of operation buttons 11 faces the key switches 51, 52, and 53 on the first printed circuit board 50 and is exposed through key holes 2x of the front case 2a.

The key holes are formed in an internal face of the front case 2a. At least some of the key holes face the display 21 on the second casing portion 3 in the closed state. Pressing faces of the function setting buttons 13, the input operation buttons 14, and the decision making buttons 15 included in the group of operation buttons 11 formed on the key sheet 40 are exposed through the key holes. By pressing the exposed pressing faces of the buttons 13, 14, and 15, the tips of the metal domes (bowl shapes) of the corresponding key switches 51, 52, and 53 are pressed and contact switch terminals. As a result, antenna connectors are established.

The second printed circuit board 100 is disposed at one end of the cellular phone apparatus 1. Specifically, the second printed circuit board 100 is disposed in the end portion 2c which is located opposite the hinge mechanism 4 on the first casing portion 2.

Figure 3A:
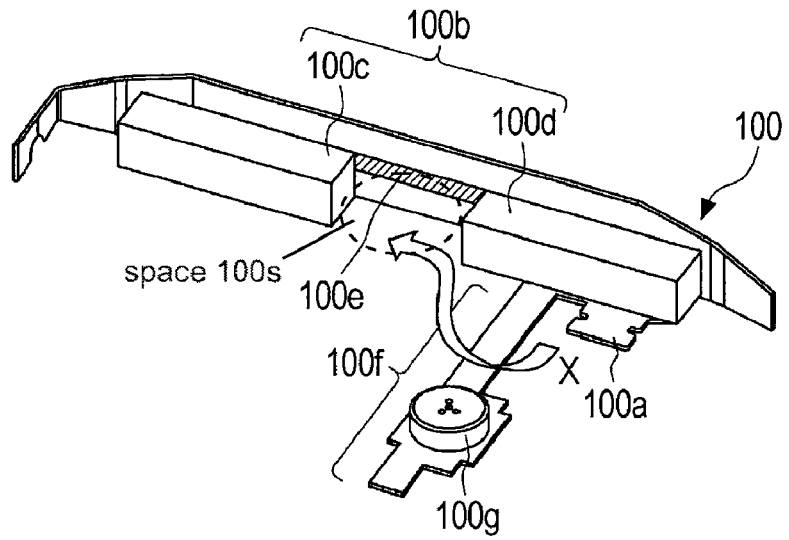
FIG. 3A illustrates a state in which an extended portion (first extended portion) formed in an edge portion of a second printed circuit board is not folded in one direction (X direction in FIG. 3A)
Figure 3B:
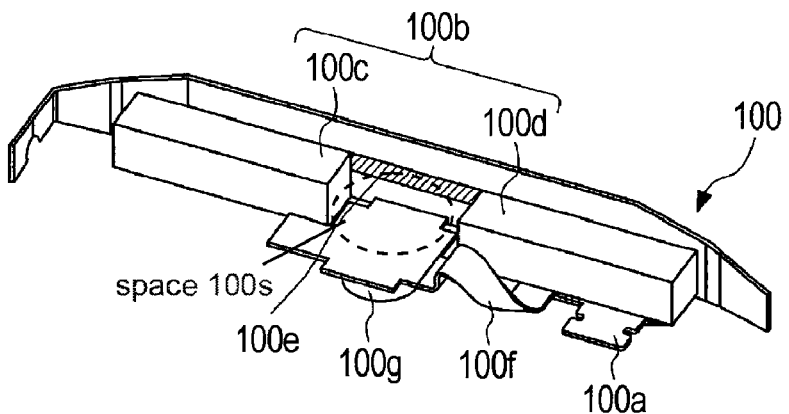
FIG. 3B illustrates a state in which the extended portion shown in FIG. 3A is folded in the direction (X direction)
Figure 3C:
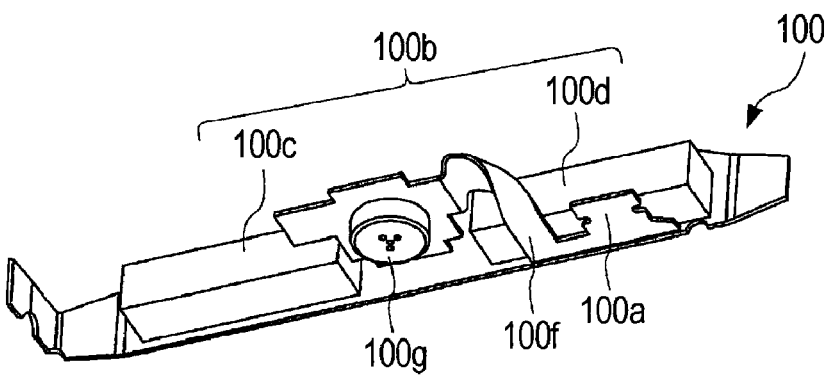
FIG. 3C illustrates the second printed circuit board which is in the state shown in FIG. 3B and viewed from the back.

Regarding the second printed circuit board 100, as shown in FIGS. 3A to 3C, the antenna unit 100b is mounted on one face of the second printed circuit board 100. The antenna unit 100b includes a first antenna element 100c and a second antenna element 100d. One end of the first antenna element 100c faces one end of the second antenna element 100d. The first antenna element 100c is connected to the second antenna element 100d in series via an antenna connector 100e. In particular, both the first antenna element 100c and the second antenna element 100d contain coils (antenna elements) that are wound tightly. Therefore, these two antenna coils are connected to each other in series via the antenna connector 100e. Further, the first antenna element 100c and the second antenna element 100d may be soldered to the second printed circuit board 100 at positions where the coils of the first antenna element 100c and the second antenna element 100d are substantially coaxial with each other. The antenna unit 100b can transmit and receive multi-signals, for example, signals in a first operating frequency band (800 MHz band) and a second operating frequency band (1.5 GHz band).

In the second printed circuit board 100, the extended portion 100f may be formed in the side edge portion of on the same face as the face where the antenna unit 100b is mounted. The extended portion 100f includes the microphone 100g which converts a voice input through the microphone hole 12 to a voice signal.

In the case where the antenna unit 100b is disposed near the microphone 100g, the microphone 100g as a conductor could degrade the transmission and reception sensitivity of the antenna unit 100b. In order to reduce the adverse effect of the microphone 100g, the microphone 100g and the antenna unit 100b should be separated at a certain distance. For example, a person may come up with a structure in which, as shown in FIG. 4A, the microphone 100g is placed on the antenna unit 100b in a vertical direction or a structure in which, as shown in FIG. 4B, the microphone 100g and the antenna unit 100b are placed side by side in a horizontal direction is conceivable.

Figure 4A:
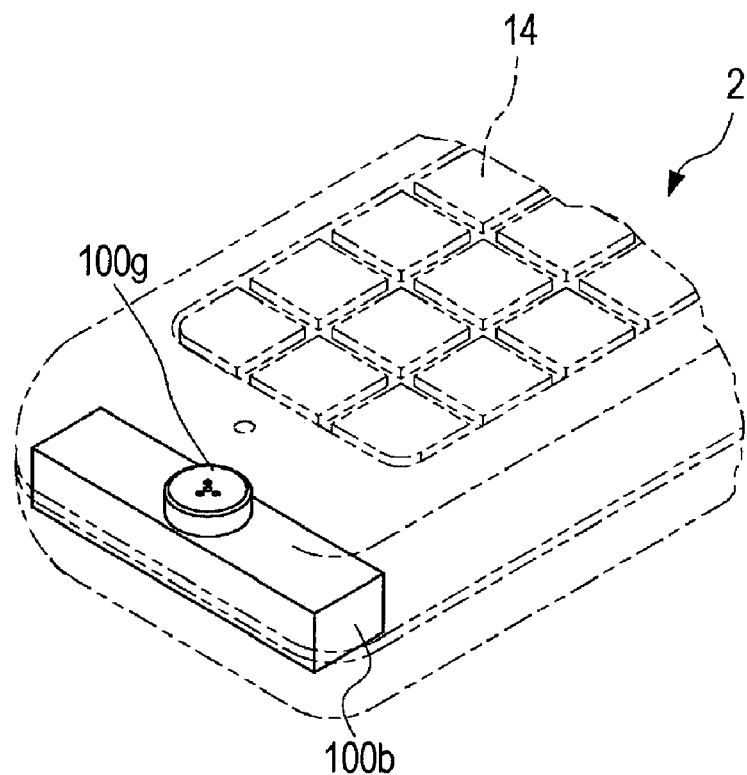
FIG. 4A is a first illustration for describing the structure in which a microphone is placed on an antenna unit in a vertical direction.
Figure 4B:
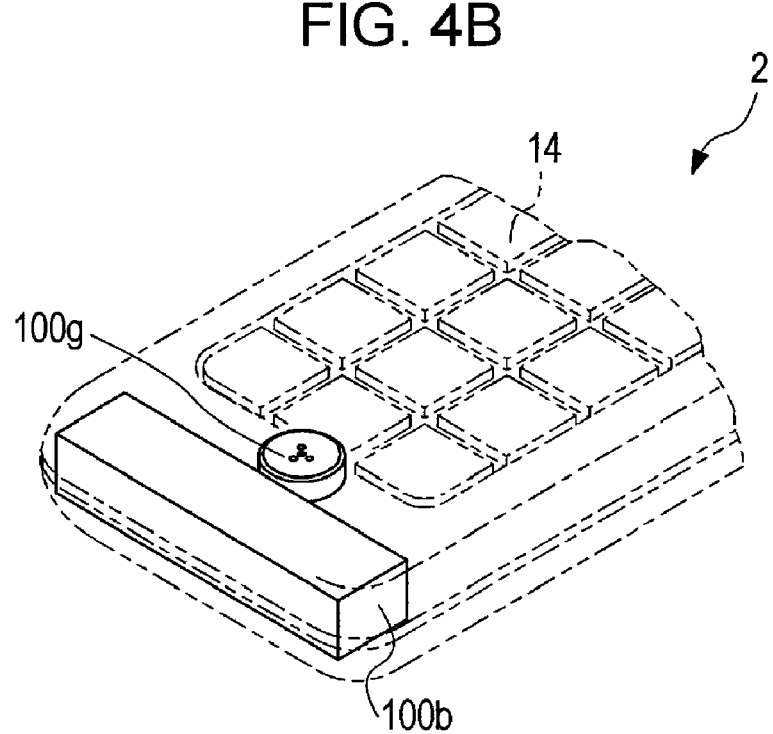
FIG. 4B is a first illustration for describing the structure in which the microphone and the antenna unit are placed side by side in a horizontal direction.

However, in the case of the structure shown in FIG. 4A, the first casing portion 2 becomes thicker for the thickness of the microphone 100g. In contrast, in the case of the structure shown in FIG. 4B, the first casing portion 2 becomes longer in a longitudinal direction.

Therefore, according to the present embodiment, the following structure is adopted to reduce the thickness and size of the cellular phone apparatus 1. That is, the antenna unit 100b is separated into two portions, namely, the first antenna element 100c and the second antenna element 100d. The microphone 100g is disposed in a space (predetermined space) formed between the first antenna element 100c and the second antenna element 100d. This space refers to a space between the antenna coils in the two antenna elements 100c and 100d.

Figure 5:
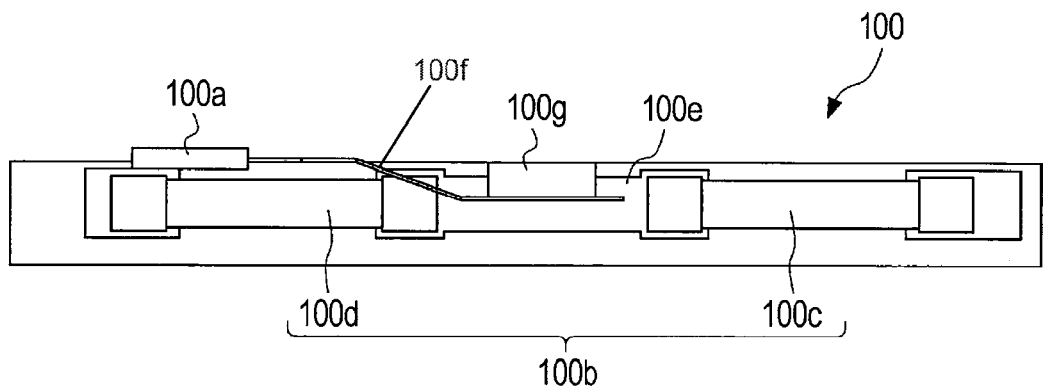
FIG. 5 is a second illustration for describing the structure of the microphone and the antenna unit.

Since the first antenna element 100c and the second antenna element 100d are connected to each other in series, as described above, terminals of the first antenna element 100c and the second antenna element 100d are connected via the antenna connector 100e. When the microphone 100g overlaps the antenna connector 100e in a direction orthogonal to an antenna-element mounting face of the second printed circuit board 100, RF signals emitted from the antenna connector 100e are affected by the microphone 100g, which may degrade the transmission and reception sensitivity of the antenna unit 100b (see FIG. 5).

Figure 6A:
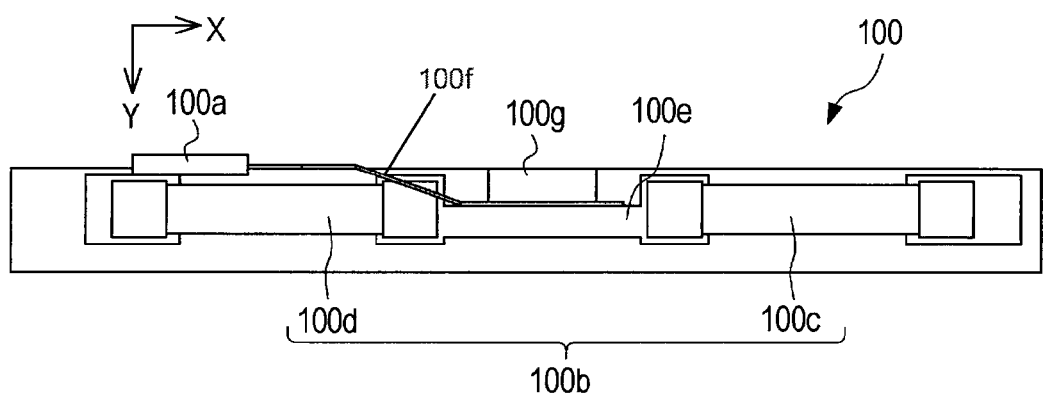
FIG. 6A is an illustration of the structure of the microphone, a antenna connector, and the antenna unit when an end portion of the first casing portion is viewed in a direction orthogonal to a mounting face of the second printed circuit board.

Therefore, according to the present embodiment, the shape of the antenna connector 100e is made recessed, as shown in FIG. 6A, in a direction in which the first antenna element 100c and the second antenna element 100d are connected (X direction in FIG. 6A). Here, the recessed shape is a shape recessed in the Y direction of FIG. 6A on the basis of a straight line connecting end portions of the first antenna element 100c and the second antenna element 100d. The microphone 100g is disposed in the recess. That is, the extended portion 100f has a twisted structure so that the microphone 100g and the antenna connector 100e do not overlap each other in a direction orthogonal to the mounting face of the second printed circuit board 100.

Figure 6B:
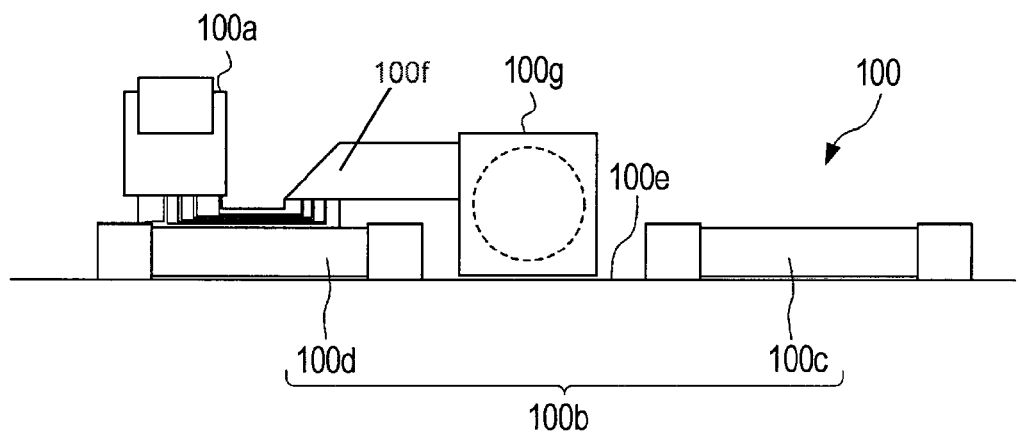
FIG. 6B is an illustration of the arrangement of the antenna unit, the antenna connector, and the microphone when the end portion of the first casing portion is viewed in a direction orthogonal to a voice input face of the microphone.

Specifically, in assembly steps of the cellular phone apparatus 1, the extended portion 100f is bent in one direction (X direction in FIG. 3A) so that, as shown in FIGS. 3B, 3C, 6A, and 6B, the microphone 100g can be disposed between the first antenna element 100c and the second antenna element 100d, and the extended portion 100f is disposed in the end portion 2c of the first casing portion 2. The voice input face of the microphone 100g is, as shown in FIGS. 6A and 6B, orthogonal to a forming face of the antenna connector 100e since the extended portion 100f is bent in the direction (X direction).

According to the present embodiment, the space 100s between the first antenna element 100c and the second antenna element 100d is positioned in the center of the end portion 2c of the first casing portion 2. Therefore, the microphone 100g can be disposed in the center of the end portion 2c. Accordingly, even when the user who is making a call uses the cellular phone apparatus 1 by holding it in the right hand and placing it against the right ear, or when the user who is making a call uses the cellular phone apparatus 1 by holding it in the left hand and placing it against the left ear, the microphone 100g is always positioned near the mouth. Therefore, a favorable calling state for the user can be achieved.

Figure 7:
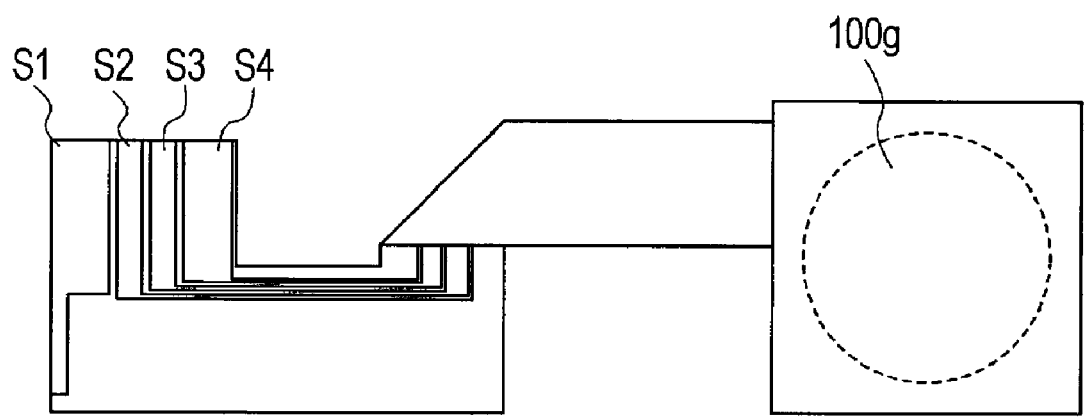
FIG. 7 is an illustration of the antenna connector of a connector included in the second printed circuit board.

Referring to FIG. 7, the connector 100a included in the second printed circuit board 100 may be wired to an antenna signal line S1 (antenna line) that transmits RF signals transmitted/received by the antenna unit 100b, a ground line S2 (first ground line) of the antenna signal line S1, a voice signal line S3 (signal line) of the microphone 100g, and a ground line S4 (second ground line) of the voice signal line S3 in this order.

Since the ground line S2 is provided between the antenna signal line S1 and the voice signal line S3 in the connector 100a, there is an advantage that negligible adverse effects are caused by signals transmitted through the voice signal line S3 on signals transmitted through the antenna signal line S1. Further, there is an advantage that negligible effects are caused by signals emitted from the antenna signal line S1 on signals transmitted through the voice signal line S3.

As described above, the second printed circuit board 100 is electrically connected to the first printed circuit board 50 via the connectors 50a and 100a. The first printed circuit board 50 is electrically connected to the second circuit board 70 via connectors (not shown).

Therefore, signals received at the antenna unit 100b are supplied via signal lines formed in the first printed circuit board 50 to the RF signal processor mounted on the second circuit board 70. In contrast, RF signals processed by the RF signal processor are supplied via signal lines formed in the first printed circuit board 50 to the antenna unit 100b mounted on the second printed circuit board 100 and emitted to the air. In the present embodiment, the first printed circuit board 50 is employed. However, the flexibility of a circuit board is not essential. A rigid board (glass epoxy board or the like) may be employed.

Voice signals generated from a voice input to the microphone 100g are supplied via signal lines formed in the first printed circuit board 50 to a voice signal processor mounted on the second circuit board 70, and predetermined processing is performed on the voice signals.

In this manner, the cellular phone apparatus 1 according to the present embodiment includes the antenna unit 100b which is separated into two portions, namely, the first antenna element 100c and the second antenna element 100d, and the microphone 100g is disposed in the space between the first antenna element 100c and the second antenna element 100d. Thus, compared with the case where the microphone 100g is placed on the antenna unit 100b in the vertical direction or the case where the microphone 100g and the antenna unit 100b are placed side by side in the horizontal direction, the cellular phone apparatus 1 can be made thinner and smaller. Further, in the cellular phone apparatus 1 according to the present embodiment, the antenna connector 100e for connecting terminals of the first antenna element 100c and the second antenna element 100d is fabricated in a shape offset (recessed shape) in the direction in which the first antenna element 100c and the second antenna element 100d are connected, toward an end portion in a transverse direction of the second printed circuit board 100. The microphone 100g is disposed in an area (recess) where the antenna connector 100e is not formed. Therefore, degradation of the transmission and reception sensitivity of the antenna unit 100b can be avoided.

Although it has been described in the present embodiment that the second printed circuit board 100 is disposed in the end portion 2c which is located opposite the hinge mechanism 4 on the first casing portion 2, the structure is not limited thereto. For example, the second printed circuit board 100 may be disposed in an end portion 3c which is located opposite the hinge mechanism 4 on the second casing portion 3. In this structure, a loudspeaker (voice output unit) is disposed in the space formed between the first antenna element 100c and the second antenna element 100d. Further, the present invention is applicable to a member (another electronic component) other than a microphone or a loudspeaker as long as the member is conductive.

Although the present invention has been described using a cellular phone apparatus by way of example, the present invention is applicable to, for example, a personal handyphone system (PHS), a portable game machine with a wireless function, a portable navigation apparatus, and a personal data assistant.

The invention claimed is:

1. A portable wireless apparatus comprising:
a casing comprising a circuit board;
an antenna contained in an end portion of the casing, the antenna comprising:
a flexible printed antenna board having a first extended portion formed by extending part of a periphery of the antenna board;
a first antenna element on the antenna board;
a second antenna element on the antenna board;
an antenna connector on the antenna board connecting the first antenna element to the second antenna element, and
a space between the first antenna element and the second antenna element; and
an electronic component not overlapping with the antenna connector in a direction orthogonal to the mounting face of the antenna board and occupying the space at least partially,
wherein the electronic component is mounted, in the first extended portion, on the same face as the mounting face of the antenna board on which the first antenna element and the second antenna element are mounted, and
wherein the first extended portion is bent so that the electronic component is positioned between the first antenna element and the second antenna element;
wherein the flexible printed board is continuous with a base end of the first extended portion and includes a second extended portion having a connector for electrical connection to the circuit board, and
wherein the second extended portion is wired to an antenna line extending from the other circuit board to the first antenna element, a first ground line, a signal line that electrically connects the other electronic component to the other circuit board, and a second ground line in this order.

* * * * *